United States Patent Office 3,371,409
Patented Mar. 5, 1968

3,371,409
METHOD OF MAKING A MANDREL FOR PRE-CISION-SHAPING INTERNAL SURFACES ON GLASS VESSELS
Robert E. Bonnet, Murray Hill, and James S. Hill, Cranford, N.J., assignors to Engelhard Industries, Inc., Newark, N.J., a corporation of Delaware
No Drawing. Filed Oct. 29, 1964, Ser. No. 407,544
4 Claims. (Cl. 29—528)

ABSTRACT OF THE DISCLOSURE

The present invention deals with a method of making a mandrel for shaping an internal surface on a glass vessel comprising coating a shaped base metal mandrel with a layer of fused oxide, snug-fitting a sleeve composed of a platinum-rhodium alloy onto the oxide-coated mandrel, shaping the sleeve to the contour of the coated mandrel, depositing a thin layer of platinum on the shaped sleeve, depositing a thin layer of gold on the platinum layer, heat treating the composite mandrel until the gold layer diffuses into the platinum layer leaving a gold-rich gold-platinum alloy surface on the mandrel.

---

Tapered glass rotameters are well known, and they are often an essential part of laboratory and industrial equipment. In such rotameters, a glass tube with an inner tapered wall forms an upward flow passage having its smallest diameter at the bottom. A float employed in the tapered tube provides an orifice of variable area between such float and the inner tapered wall of the glass tube. As flow varies, the float moves accordingly in the tube, reaching a position of equilibrium determined by the orifice area. The position of the float indicates the rate of flow. Such position can be read directly on a calibrated scale on the glass tube, or by various other means. Since it is the orifice area which is the determining factor for movement of flow, it is critical that the glass tube is tapered with exact precision.

The glass rotameter, e.g., a Pyrex glass rotameter, may be formed by contacting the internal surfaces of a heated glass tubing with a tapered mandrel of stainless steel whereon the tubing is heated and a vacuum pulled therethrough thereby shaping the internal surface of the tubing to the tapered contour of the mandrel. Thereafter, the glass is cooled and the mandrel removed.

Because of carbonization of the stainless steel mandrel, which builds up gradually causing uncontrollable variations in the dimensions of the rotameter tubes, constant inspection is required and many of the finished tubes had to be rejected. Furthermore, production was halted when replacing the deteriorated mandrels.

In accordance with this invention, the mandrel for forming the precision-tapered passage of heat-resistant glass tubing is coated with a precious metal alloy, in particular a platinum-gold alloy, which is heat resistant at high temperatures, hard, and is essentially not wetted by molten glass, whereby the mandrel retains the precision dimensions over periods of long use and insures the reproduction of exact precision-tapered surfaces on rotameters thereby formed.

It is an object of the invention to provide a method for the making of precision-shaped internal surfaces on glass vessels.

It is another object of the invention to provide a method for the manufacture of precision rotameters from high temperature resistant glass tubing.

It is a further object of the invention to provide a method for the manufacture of exactly reproducible precision internal surfaces in glass vessels.

Other objects and advantages of the invention will become apparent from the description hereinafter following:

In accordance with the invention a base metal body, e.g., a mandrel having a tapered end portion, composed of stainless steel molybdenum or other base metal having suitable strength at high temperatures, is first roughened, cleaned and degreased, and is thereafter coated with a fused refractory oxide such as an oxide of alumina or zirconia which may be provided by spraying the molten oxide onto the mandrel to provide a thin layer of fused oxide thereon. Thereafter, a tubing or sleeve of a platinum-rhodium alloy, e.g., an alloy composed of platinum and 10%–40% rhodium and having a thickness of e.g. 0.010 inch or 0.015 inch, is telescoped over the oxide-coated mandrel and snug-fitted thereon to conform with the contour of the mandrel such as by swaging or the like and is thereafter machined to precision contour. Having provided the platinum-rhodium sheath on the mandrel, a thin layer of platinum is preferably electroplated on the sheath under controlled conditions for precision tolerance, and, thereafter, a thin gold layer is deposited onto the platinum layer preferably by electroplating. Following the application of the gold layer, the composite mandrel is heat-treated to diffusion temperature whereby the platinum and gold interfuse largely at their interface and to a lesser degree toward the surface with the surface comprising a gold-rich platinum-gold alloy composition. Having so formed the composite mandrel, the tapered rotameter is provided by telescoping a high temperature glass tube, such as a Pyrex tube, over the composite mandrel whereon the glass tubing is heated to at least softness and molded or press-formed or preferably vacuum-formed so that the internal surface of the glass tubing is shaped to the tapered contour of the mandrel and thereafter the shaped tubing is permitted to cool and is subsequently removed from the mandrel.

Alloys of platinum with up to about 50% rhodium have been suggested and used for the manufacture of many types of high temperature devices. These alloys combining the required properties for the purpose, to a large extent, such as hardness and corrosion resistance.

However, for apparatus handling hot or molten glass, a further requirement for satisfactory operation becomes important, i.e., the surface which is in contact with the hot or molten glass should not be wetted thereby or there should be no more than a very low adhesion between the glass and the metal. This requirement is not satisfactorily met by the platinum-rhodium alloys used heretofore. On the other hand, it is known that platinum-gold alloys show a considerable resistance to wetting or adhesion by molten glass or hot glass, but they are mechanically insufficiently resistant, especially at the high temperatures of molten or plastic glasses.

It has been found that the desired properties of hardness, and of non-wetting by molten glass or adhesion by hot glass, can be obtained by depositing, e.g. by electroplating or by any other suitable method, a double coating upon an article previously coated by a platinum-rhodium alloy.

According to the invention, and as described above, a sheath of a platinum-rhodium alloy is snug fitted onto an oxide-coated preshaped mandrel. Thereafter, the platinum-rhodium surface is coated with platinum and then with a coating of gold and thereafter heated to diffusion temperature, preferably by placing it in a furnace at about 800° C. and gradually raising the temperature to about 1200° C. The heat treatment causes the platinum and gold layers to diffuse into each other whereby, in the different boundary zones, solid solutions are formed, thus insuring that the metallic coatings adhere firmly to each other and to the platinum-rhodium surface.

A flow diagram illustrating the order of steps is as follows:

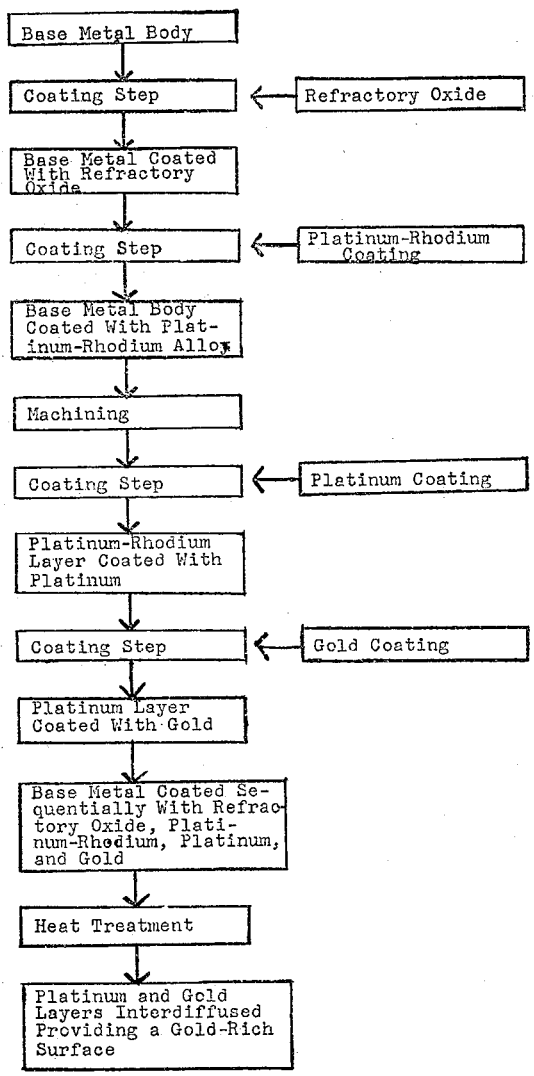

The coatings of platinum and gold may be in the range of about 0.0001 to about 0.001 inch and good results have been obtained with layers of about 0.0005 inch.

Moreover, it has been found by tests made with platinum-rhodium alloys containing 10 percent to 40 percent by weight rhodium, and coated according to this invention, that the surfaces obtained display a combination of properties which the single components do not show. The surfaces are extremely repellent to molten glass, due to the predominating content of gold in the outer layer, wherein some platinum but practically no rhodium is present, but at the same time the hardness is increased beyond the hardness the original platinum-rhodium alloy would have attained, when subjected to the same heat treatment, without being coated or if coated with one of the components only.

It is believed that this result is due to the formation of solid solutions which are gradually enriched in gold near the surface whereas an increasing content of rhodium is present deeper in the metal. The intermediate layer of platinum prevents undesirable diffusion between the rhodium content of the alloy and the gold coating, thus acting simultaneously as a buffer and as a bonding agent between the platinum-rhodium alloy and the gold layer.

The method of providing precision-shaped internal surfaces on glass vessels as described above, by means of the particular composite mandrel described, assures the exact reproduction of precision internal surfaces without the disadvantage of the necessity for constant inspection and low yield as with the stainless steel mandrels hereinbefore employed.

Various modifications of the invention are intended within the scope of the appended claims.

What is claimed is:

1. The method of making a mandrel for shaping an internal surface on a glass vessel comprising coating a shaped base metal mandrel with a layer of fused oxide, snug-fitting a sleeve composed of a platinum-rhodium alloy onto the oxide-coated mandrel, shaping the sleeve to the contour of the coated mandrel, depositing a thin layer of platinum on the shaped sleeve, depositing a thin layer of gold on the platinum layer, heat treating the composite mandrel until the gold layer diffuses into the platinum layer leaving a gold-rich gold-platinum alloy surface on the mandrel.

2. The method of making a mandrel for shaping an surface on a glass vessel according to claim 1, wherein the sleeve is composed of platinum and 10%–40% rhodium.

3. The method of making a mandrel for shaping an internal surface on a glass vessel wherein the glass vessel is a glass tube.

4. The method of making a mandrel for shaping an internal surface on a glass vessel according to claim 1, comprising heat treating the gold-coated mandrel until the gold layer diffuses into the platinum layer largely at their interface and to a lesser degree toward the surface of the mandrel.

References Cited
UNITED STATES PATENTS

| | | | |
|---|---|---|---|
| 1,301,714 | 4/1919 | Kueppers | 65—108 |
| 1,999,525 | 4/1935 | Morscholz | 65—109 |
| 2,106,527 | 1/1938 | Hostetter | 65—374 |
| 2,822,501 | 2/1958 | Poulter | 65—110 X |
| 2,973,283 | 2/1961 | Hill | 65—374 X |

S. LEON BASHORE, *Acting Primary Examiner.*

FRANK W. MIGA, *Examiner.*